(12) United States Patent
Zhang et al.

(10) Patent No.: US 9,077,012 B2
(45) Date of Patent: *Jul. 7, 2015

(54) MEMBRANE ELECTRODE ASSEMBLY AND BIOFUEL CELL USING THE SAME

(75) Inventors: Li-Na Zhang, Beijing (CN); Kai-Li Jiang, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 432 days.

This patent is subject to a terminal disclaimer.

(21) Appl. No.: 12/384,963

(22) Filed: Apr. 9, 2009

(65) Prior Publication Data

US 2010/0151278 A1  Jun. 17, 2010

(30) Foreign Application Priority Data

Dec. 17, 2008  (CN) .......................... 2008 1 0241835

(51) Int. Cl.
| | | |
|---|---|---|
| H01M 8/16 | (2006.01) | |
| H01M 8/10 | (2006.01) | |
| H01M 4/90 | (2006.01) | |
| H01M 8/02 | (2006.01) | |

(52) U.S. Cl.
CPC .............. *H01M 8/1004* (2013.01); *H01M 4/90* (2013.01); *H01M 8/0234* (2013.01); *H01M 8/16* (2013.01); *Y02E 60/521* (2013.01); *Y02E 60/527* (2013.01)

(58) Field of Classification Search
CPC ... H01M 8/1004; H01M 8/0234; H01M 8/16; H01M 4/90; Y02E 60/521; Y02E 60/527
See application file for complete search history.

(56) References Cited

U.S. PATENT DOCUMENTS

| | | | |
|---|---|---|---|
| 6,528,200 B1 | 3/2003 | Yaoshitake et al. | |
| 6,616,495 B1 | 9/2003 | Tsuboi | |
| 6,761,990 B1 | 7/2004 | Yaoshitake et al. | |
| 6,818,338 B2 * | 11/2004 | Kubota et al. ................. | 429/434 |

(Continued)

FOREIGN PATENT DOCUMENTS

| | | |
|---|---|---|
| CN | 1479949 A | 3/2004 |
| CN | 1734812 A | 2/2006 |

(Continued)

OTHER PUBLICATIONS

The definition of "end to end", in The American Heritage® Dictionary of Idioms, 2007, retrieved from http://www.credoreference.com/entry/hmidiom/end—to—end.*

(Continued)

*Primary Examiner* — Ula C Ruddock
*Assistant Examiner* — Frank Chernow
(74) *Attorney, Agent, or Firm* — Novak Druce Connolly Bove + Quigg LLP

(57) ABSTRACT

A membrane electrode assembly includes a proton exchange membrane, an anode and a cathode. The proton exchange membrane has two opposite surfaces, a first surface and a second surface. The anode is located adjacent to the first surface of the proton exchange membrane, and the cathode is located adjacent to the second surface of the proton exchange membrane. The anode includes a diffusion layer and a catalyst layers. The diffusion layer includes a carbon nanotube structure. A biofuel cell using the membrane electrode assembly is also provided.

10 Claims, 16 Drawing Sheets

(56) References Cited

U.S. PATENT DOCUMENTS

| | | |
|---|---|---|
| 6,887,451 B2 | 5/2005 | Dodelet et al. |
| 6,933,067 B2 | 8/2005 | Kawahara et al. |
| 7,045,108 B2 | 5/2006 | Jiang et al. |
| 7,704,480 B2 | 4/2010 | Jiang et al. |
| 2002/0049134 A1 | 4/2002 | Imazato |
| 2002/0197525 A1 | 12/2002 | Tomita et al. |
| 2004/0053053 A1 | 3/2004 | Jiang et al. |
| 2004/0053780 A1 | 3/2004 | Jiang et al. |
| 2005/0197246 A1 | 9/2005 | Yoshida et al. |
| 2006/0116284 A1 | 6/2006 | Pak et al. |
| 2006/0183300 A1 | 8/2006 | Mosdale et al. |
| 2007/0218345 A1 | 9/2007 | Sakai et al. |
| 2007/0231673 A1 | 10/2007 | Noh |
| 2007/0237952 A1 | 10/2007 | Jiang et al. |
| 2007/0237959 A1* | 10/2007 | Lemaire ............... 428/408 |
| 2007/0243449 A1 | 10/2007 | Sotomura et al. |
| 2008/0044722 A1* | 2/2008 | Mohamadinejad et al. .... 429/44 |
| 2008/0095694 A1 | 4/2008 | Nakayama et al. |
| 2008/0170982 A1* | 7/2008 | Zhang et al. ............... 423/447.3 |
| 2008/0223516 A1 | 9/2008 | Tanuma |
| 2008/0248235 A1 | 10/2008 | Feng et al. |
| 2008/0299031 A1 | 12/2008 | Liu et al. |
| 2009/0208708 A1 | 8/2009 | Wei et al. |
| 2009/0305113 A1 | 12/2009 | Minteer et al. |
| 2010/0021774 A1* | 1/2010 | Zhang et al. ............... 429/2 |
| 2010/0021797 A1* | 1/2010 | Zhang et al. ............... 429/42 |
| 2010/0151297 A1* | 6/2010 | Zhang et al. ............... 429/40 |
| 2010/0255402 A1 | 10/2010 | Heo et al. |

FOREIGN PATENT DOCUMENTS

| | | |
|---|---|---|
| CN | 1912200 | 2/2007 |
| CN | 1948144 | 4/2007 |
| CN | 1960943 A | 5/2007 |
| CN | 101024495 | 8/2007 |
| CN | 100400470 | 7/2008 |
| CN | 100411979 | 8/2008 |
| CN | 101239712 | 8/2008 |
| CN | 101284662 | 10/2008 |
| CN | 101314464 | 12/2008 |
| EP | 1777195 A1 | 4/2007 |
| EP | 1777195 A8 | 4/2007 |
| JP | 2002-343379 | 11/2002 |
| JP | 2004-103403 | 4/2004 |
| JP | 2004-146226 | 5/2004 |
| JP | 2004-207231 | 7/2004 |
| JP | 2004-363018 | 12/2004 |
| JP | 2005-324086 | 11/2005 |
| JP | 2006-80083 | 3/2006 |
| JP | 2008059841 | 3/2008 |
| TW | 200524201 | 7/2005 |
| TW | I238555 | 8/2005 |
| TW | 200722368 | 6/2007 |
| TW | 200724486 | 7/2007 |
| WO | WO2007052650 | 5/2007 |
| WO | WO2007084249 | 7/2007 |
| WO | WO2007084249 A2 * | 7/2007 ............... H01M 4/00 |

OTHER PUBLICATIONS

Zhang, Mei, Shaoli Fang, Anvar Zakhidov, Sergey Lee, Ali Aliev, Christopher Williams, Ken Atkinson, and Ray Baughman. "Strong, Transparent, Multifunctional, Carbon Nanotube Sheets." Science 309.5738 (2005): 1215-219.*

Mei Zhang et al., Strong, Transparent, Multifunctional, Carbon Nanotube Sheets, Science, vol. 309, p. 1215-1219 2005).

Effective adhesion of Pt nanoparticles on thiolated multi-wailed carbon nanotubes and their use for fabricating electrocatalysts, Guang-Wu Yang et al., Carbon, vol. 45, p. 3036-3041(2007).

Fan et al. "Explorations on growth mechanism, controlled synthesis and applications of carbon nanotubes", Dec. 31, 2006, Physics, vol. 35, p. 376-381. Paragraph 2 of Left Column of p. 379 to Paragraph 2 of Right Column of p. 379 may be relevant.

Wu et al. "Transparent,Conductive Carbon nanotube Films" Science, 2004,08, vol. 305, p. 1273-1276. Paragraph 1 and Paragraph 2 of col. 3 of p. 1273 and FIG. 1D may be relevant.

Zhang et al. "Spinning and Processing Continuous Yarns from 4-Inch Wafer Scale Super-Aligned Carbon Nanotube Arrays" Advanced Materials, 2006, vol. 18, p. 1505-1510.FIG. 1 and FIG. 2 may be relevant.

Xin Wang, CNT-Based Electrodes with High Efficiency for PEMFCs, ESSL, 2005, 8(1), A42-A44.

* cited by examiner

MEMBRANE ELECTRODE ASSEMBLY AND BIOFUEL CELL USING THE SAME

RELATED APPLICATIONS

This application is related to co-pending applications entitled "MEMBRANE ELECTRODE ASSEMBLY AND FUEL CELL USING THE SAME", U.S. patent application Ser. No. 12/384,942, filed Apr. 9, 2009; "MEMBRANE ELECTRODE ASSEMBLY AND BIOFUEL CELL USING THE SAME", U.S. patent application Ser. No. 12/384,964, filed Apr. 9, 2009; and "MEMBRANE ELECTRODE ASSEMBLY AND FUEL CELL USING THE SAME", U.S. patent application Ser. No. 12/384,931, filed Apr. 9, 2009. The disclosures of the above-identified applications are incorporated herein by reference. "MEMBRANE ELECTRODE ASSEMBLY AND METHOD FOR MAKING THE SAME", U.S. patent application Ser. No. 12/006,309, filed Dec. 29, 2007; "MEMBRANE ELECTRODE ASSEMBLY AND METHOD FOR MAKING THE SAME", U.S. patent application Ser. No. 12/006,336, filed Dec. 29, 2007; "MEMBRANE ELECTRODE ASSEMBLY AND METHOD FOR MAKING THE SAME", U.S. patent application Ser. No. 12/200,338, filed Aug. 28, 2008 are also related to the instant application.

BACKGROUND

1. Technical Field

The disclosure generally relates to membrane electrode assemblies and biofuel cell using the same, and particularly, to a membrane electrode assembly based on carbon nanotubes and a biofuel cell using the same.

2. Description of Related Art

Fuel cells can generally be classified into alkaline, solid oxide, and proton exchange membrane fuel cells. The proton exchange membrane fuel cell has received increasingly more attention and has developed rapidly in recent years. Typically, the proton exchange membrane fuel cell includes a number of separated fuel cell work units. Each work unit includes a fuel cell membrane electrode assembly (MEA), flow field plates (FFP), current collector plates (CCP), as well as related support equipment, such as blowers, valves, and pipelines.

Referring to FIG. 12, a biofuel cell, which is a specific type of proton exchange membrane fuel cell, is disclosed by the prior art. The biofuel cell includes a fuel electrode 1, electroanalysis layer 3 and a gas electrode 5. The electroanalysis layer 3 has two opposite surfaces. The fuel electrode 1 is located adjacent to one surface of the electroanalysis layer 3. The gas electrode 5 is located adjacent to the opposite surface of the electroanalysis layer 3. The fuel electrode 1 includes a diffusion layer 11 and a container (not marked) filled with enzymatic catalyst (not show) and biofuel (not show). The electroanalysis layer 3 is made of proton exchange membrane. The gas electrode 5 includes a diffusion layer (not show) and a catalyst layer (not show) located adjacent to the diffusion layer. The diffusion layer 11 of the fuel electrode 1 is typically made of glass like carbon having a plurality of micropores.

In working process of the biofuel cell, the enzymatic catalyst decomposes a biofuel to form electrons and protons ($H^+$). The protons are transferred by the electroanalysis layer 3 from fuel electrode 1 to gas electrode 5. At the same time, the electrons arrive at the gas electrode 5 by an external electrical circuit. In the gas electrode 5, oxygen is applied. Thus, the oxygen reacts with the protons and electrons as shown in the following equation: $\frac{1}{2}O_2 + 2H^+ + 2e^- \rightarrow H_2O$.

However, the glass like carbon has the following disadvantages. Firstly, the micropores in the glass like carbon are not uniform. Thus, the structure prevents the diffusion layer from uniformly diffusing the biofuel and/or gases that are needed for the MEA. Secondly, the glass like carbon has high electrical resistance, thereby the travel of electrons between the diffusion layer and the external electrical circuit is restricted. As a result, the reaction activity of the MEA is reduced.

What is needed, therefore, are a membrane electrode assembly and a biofuel cell using the same having improved reaction activity.

BRIEF DESCRIPTION OF THE DRAWINGS

Many aspects of the present membrane electrode assembly and biofuel cell using the same can be better understood with references to the following drawings. The components in the drawings are not necessarily drawn to scale, the emphasis instead being placed upon clearly illustrating the principles of the present membrane electrode assembly and biofuel cell using the same.

FIG. 3B shows a schematic view of the carbon nanotube segments joined end to end of the drawn carbon nanotube film in FIG. 2.

FIG. 3C shows the drawn carbon nanotube films are situated side-by-side to increase the area of the carbon nanotube structure.

FIG. 3D shows an SEM image of one embodiment of a carbon nanotube film structure including include at least two stacked drawn carbon nanotube films.

FIG. 3E is an exploded, isometric view of the carbon nanotube film structure of FIG. 3D.

FIG. 3F is an exploded, isometric view of another embodiment a carbon nanotube film structure.

Figure 1:
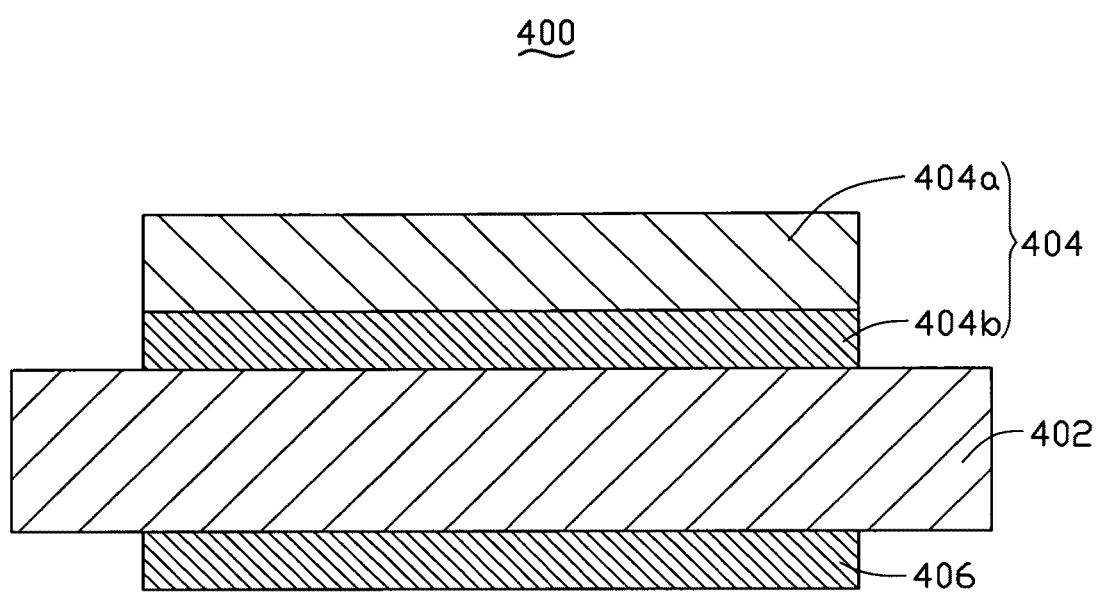
FIG. 1 is a schematic view of a membrane electrode assembly in accordance with an embodiment.

Corresponding reference characters indicate corresponding parts throughout the several views. The exemplifications set out herein illustrate at least one present embodiment of the membrane electrode assembly and biofuel cell using the same, in at least one form, and such exemplifications are not to be construed as limiting the scope of the disclosure in any manner.

DETAILED DESCRIPTION

References will now be made to the drawings, in detail, to describe embodiments of the membrane electrode assembly and biofuel cell using the same.

Referring to FIG. 1, a membrane electrode assembly 400 according to one embodiment is shown. The membrane electrode assembly 400 includes a proton exchange membrane 402, an anode 404 and a cathode 406. The proton exchange membrane 402 has two opposite surfaces, a first surface and a second surface. The anode 404 is located adjacent to the first surface of the proton exchange membrane 402 and the cathode 406 is located adjacent to the second surface of the proton exchange membrane 402. The anode 404 includes a diffusion layer 404a and a biofuel catalyst layer 404b. The biofuel catalyst layer 404b can be located adjacent to at least one surface of the diffusion layer 404a. In one embodiment, the biofuel catalyst layer 404b is located between the diffusion layer 404a and the proton exchange membrane 402, and contacted with the diffusion layer 404a and the proton exchange membrane 402.

The diffusion layer 404a includes a carbon nanotube structure. The carbon nanotube structure includes a plurality of carbon nanotubes distributed uniformly therein. A plurality of carbon nanotubes are arranged orderly or disorderly, entangled or arranged along a primary direction in the carbon nanotube structure. For example, the carbon nanotubes can be entangled with each other, forming a carbon nanotube structure with disordered arrangement of carbon nanotubes. Alternatively, if the carbon nanotube structure includes ordered arrangement of carbon nanotubes, the carbon nanotubes can be primarily oriented along the same direction, or along two or more directions. The carbon nanotubes in the carbon nanotube structure can be selected from a group consisting of single-walled carbon nanotubes, double-walled carbon nanotubes, and/or multi-walled carbon nanotubes. The length of the carbon nanotubes ranges from about 200 to about 900 micrometers in one embodiment.

The carbon nanotube structure can include at least one carbon nanotube film, at least one carbon nanotube wire or combinations thereof. The carbon nanotubes of the diffusion layer 404a can be in the structure of a carbon nanotube film or carbon nanotube wire. In one embodiment, the carbon nanotube structure has an overall planar structure. The carbon nanotube film can be a drawn carbon nanotube film, a pressed carbon nanotube film, or a flocculent carbon nanotube film. The area and the thickness of the carbon nanotube structure are unlimited and could be made according to user's specific needs. The carbon nanotube structure can be a free-standing structure, e.g. the carbon nanotube structure can keep its integrity without the use of a supporter.

Figure 2:
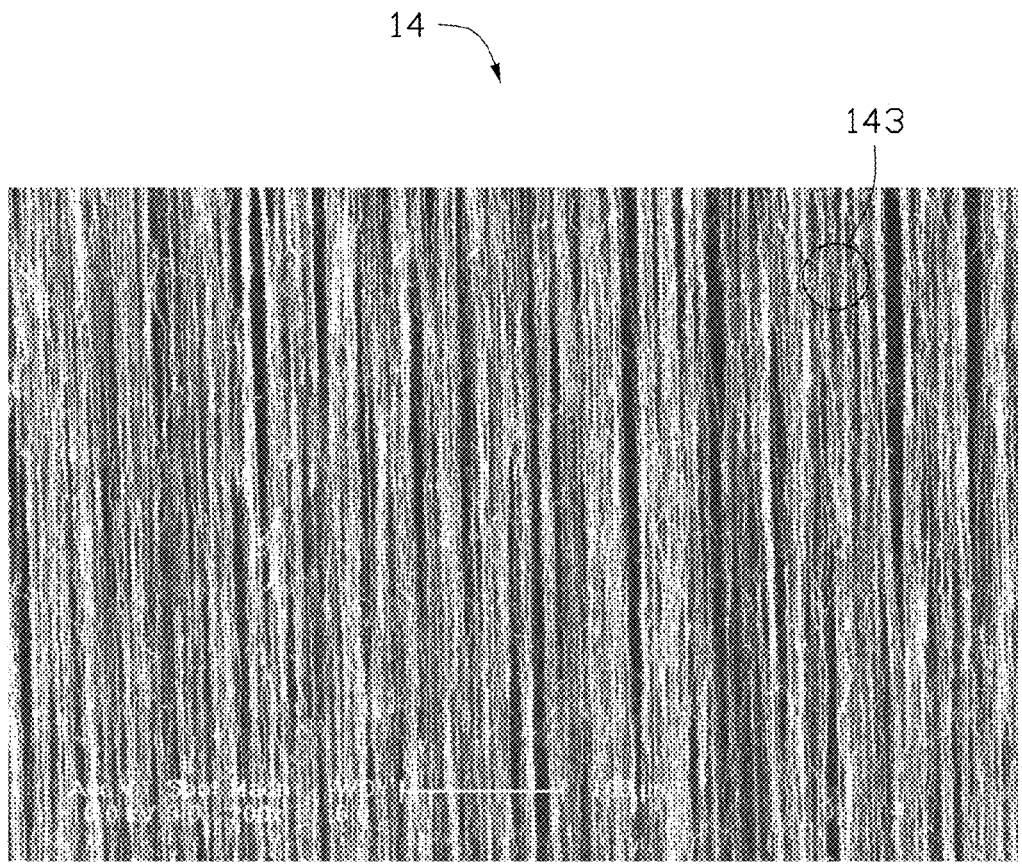
FIG. 2 is a Scanning Electron Microscope (SEM) image of a drawn carbon nanotube film includes a plurality of carbon nanotube segments joined end to end of the drawn carbon nanotube film.
Figure 3A:
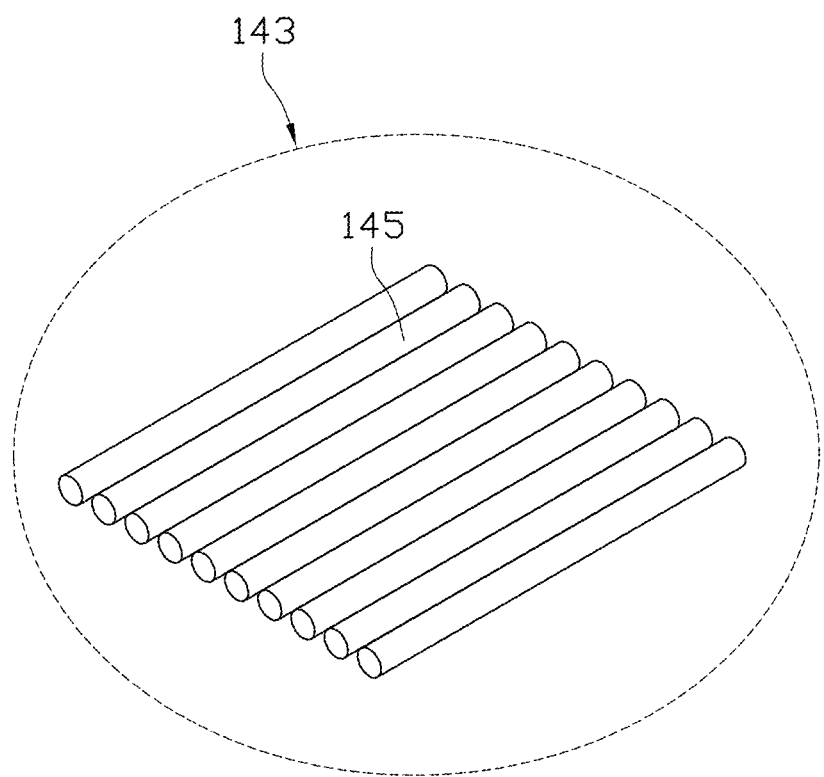
FIG. 3A is a schematic view of a carbon nanotube segment of the drawn carbon nanotube film of FIG. 2.
Figure 3B:
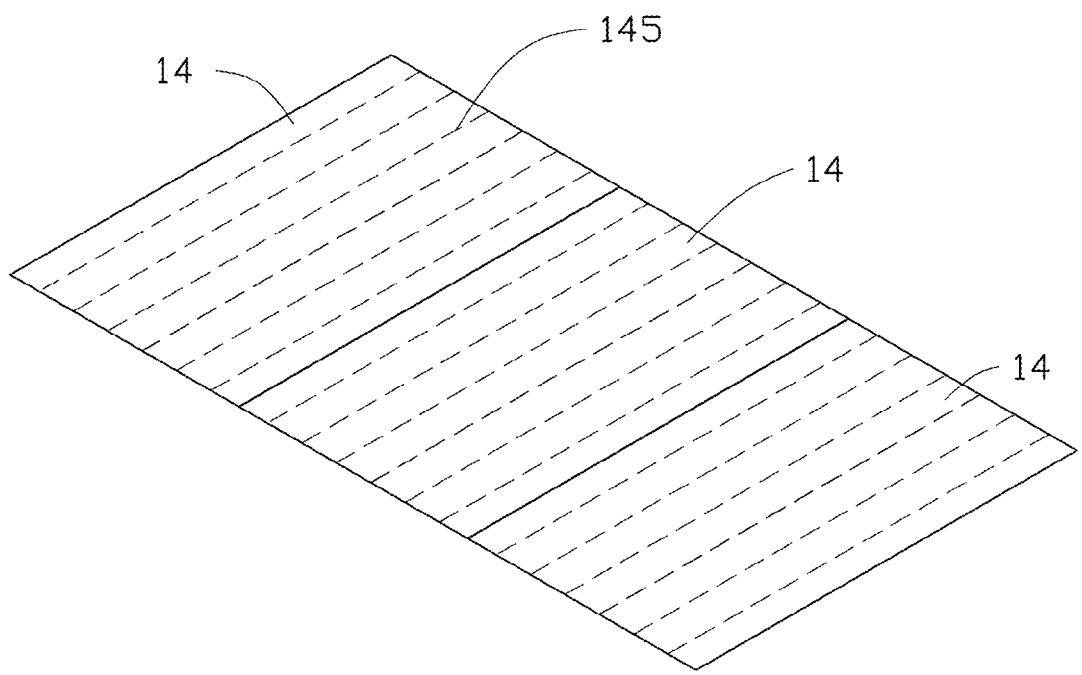
FIG. 3B shows the drawn carbon nanotube films are situated side-by-side to increase the area of the carbon nanotube structure.
Figure 3C:
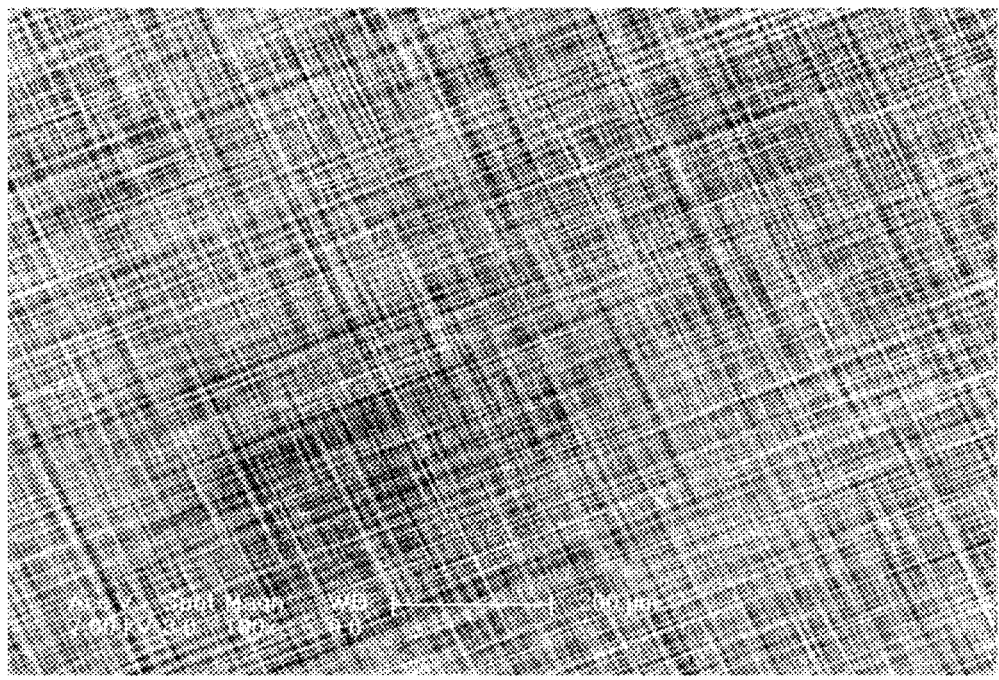
FIG. 3C shows an SEM image of one embodiment of a carbon nanotube film structure including include at least two stacked drawn carbon nanotube films.
Figure 3D:
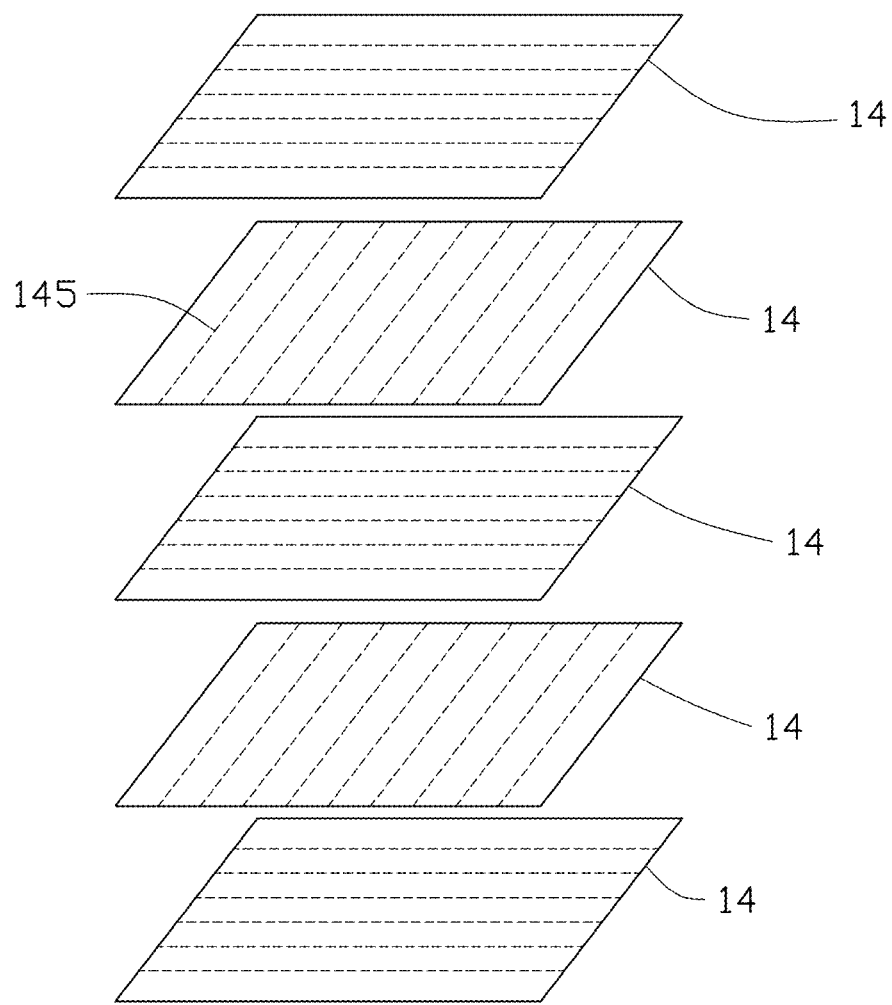
FIG. 3D is an exploded, isometric view of the carbon nanotube film structure of FIG. 3D.
Figure 3E:
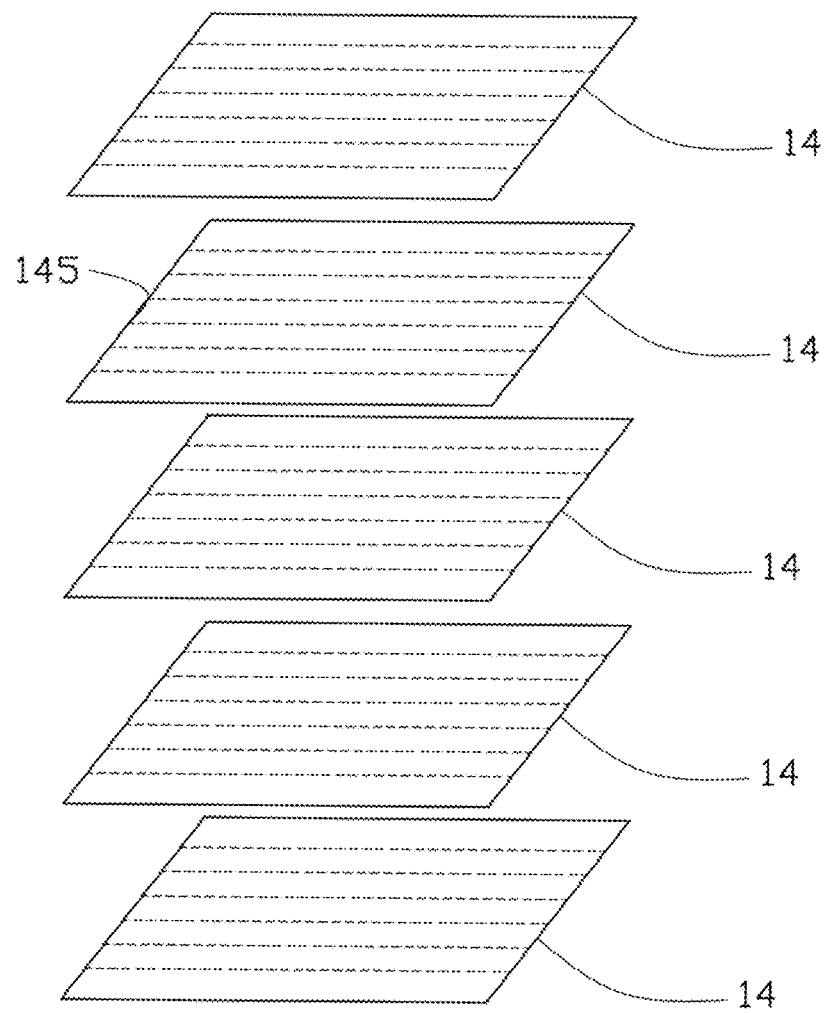
FIG. 3E is an exploded, isometric view of another embodiment a carbon nanotube film structure.

In one embodiment, the carbon nanotube structure includes one drawn carbon nanotube film 14. Referring to FIGS. 2 and 3A, each drawn carbon nanotube film 14 includes a plurality of successively oriented carbon nanotube segments 143 joined end-to-end by van der Waals attractive force therebetween. Referring to FIG. 3A, each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the drawn carbon nanotube film 14 are also typically oriented along a preferred orientation.

The drawn carbon nanotube film 14 can be pulled out from a super-aligned carbon nanotube array 144 on a substrate. A width and a length of the drawn carbon nanotube film 14 are dependent on a size of the carbon nanotube array 144. In one embodiment, if the substrate is a 4-inch P-type silicon wafer, the width of the drawn carbon nanotube film 14 is in a range from about 0.5 nanometers to about 10 centimeters, and the thickness of the drawn carbon nanotube film 14 is in a range from about 0.5 nanometers to about 100 micrometers. The length of the drawn carbon nanotube film 14 drawn from a 4-inch P-type silicon wafer can be greater than 10 meters.

Referring to FIG. 3B through FIG. 3E, the carbon nanotube structure includes two or more drawn carbon nanotube films 14. The two or more drawn carbon nanotube films 14 can be situated side-by-side and/or stacked with each other to form a planar carbon nanotube structure. Adjacent drawn carbon nanotube films 14 can be combined with each other by van der Waals attractive force therebetween. An angle α between the preferred orientations of the carbon nanotubes 145 in the two adjacent stacked drawn carbon nanotube films 14 is in a range of $0 \leq \alpha \leq 90°$. Thus, the carbon nanotube structure includes a plurality of micropores defined by the stacked drawn carbon nanotube films 14. The micropores of one embodiment are distributed in the carbon nanotube structure uniformly. Diameters of the micropores can range from about 1 to about 10 micrometers. The micropores can be used to diffuse the gas. It is to be understood that there can be some variation in the carbon nanotube structure.

Figure 4:
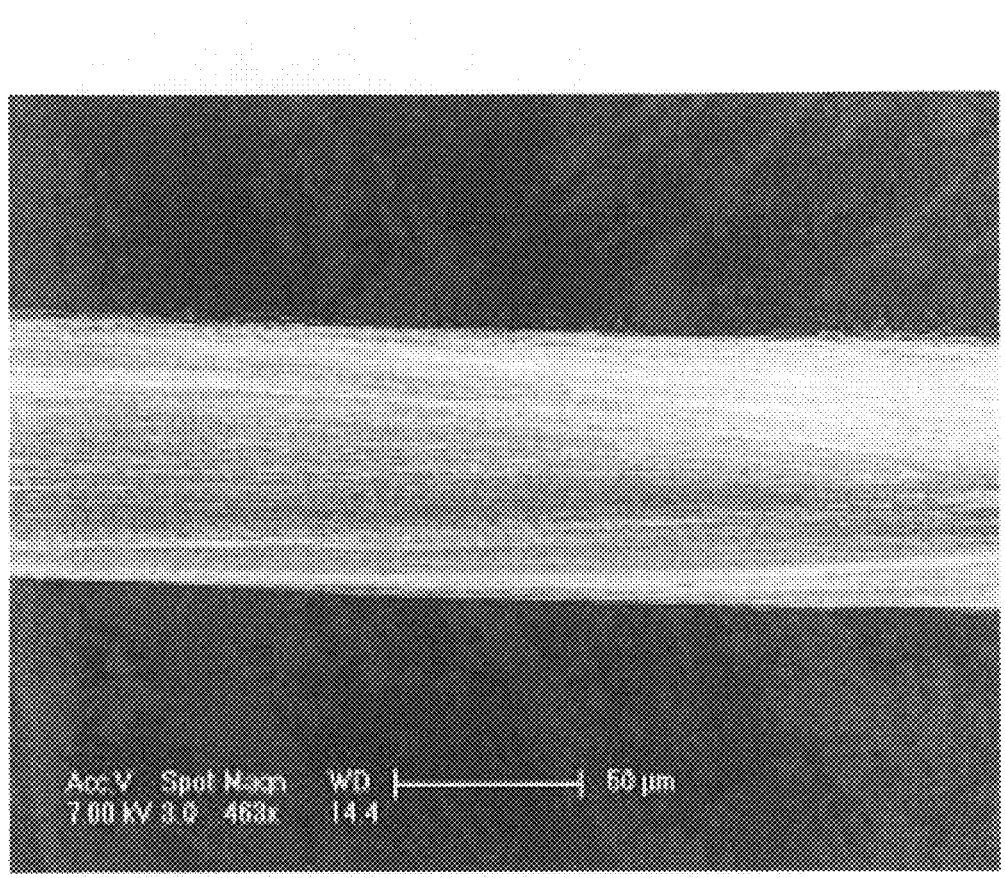
FIG. 4 is a Scanning Electron Microscope (SEM) image of an untwisted carbon nanotube wire.

Further, the carbon nanotube structure can include at least one carbon nanotube wire. A single carbon nanotube wire can be folded, convoluted or otherwise shaped to form the planar carbon nanotube structure. Alternatively the carbon nanotube structure can include a plurality of carbon nanotube wires, the carbon nanotube wires can be located side by side, crossed, or weaved together to form the planar carbon nanotube structure. The carbon nanotube wire can be twisted or untwisted. The untwisted carbon nanotube wire is formed by treating the drawn carbon nanotube film with an organic solvent. Specifically, the drawn carbon nanotube film is treated by applying the organic solvent to the drawn carbon nanotube film so as to soak the entire surface of the drawn carbon nanotube film in the organic solvent. After being soaked by the organic solvent, the adjacent paralleled carbon nanotubes in the drawn carbon nanotube film will be bundled together, due to the surface tension of the organic solvent when the organic solvent volatilizing, and thus, the drawn carbon nanotube film is shrunk into untwisted carbon nanotube wire. The organic solvent is volatile. Referring to FIG. 4, the untwisted carbon nanotube wire includes a plurality of carbon nanotubes substantially oriented along the same direction (e.g., a direction along the length of the untwisted carbon nanotube wire). The carbon nanotubes are parallel to the axis of the untwisted carbon nanotube wire. A length of the untwisted carbon nanotube wire can be set as desired. A diameter of the untwisted carbon nanotube wire can be in a range from about 0.5 nanometers to about 100 micrometers.

Figure 5:
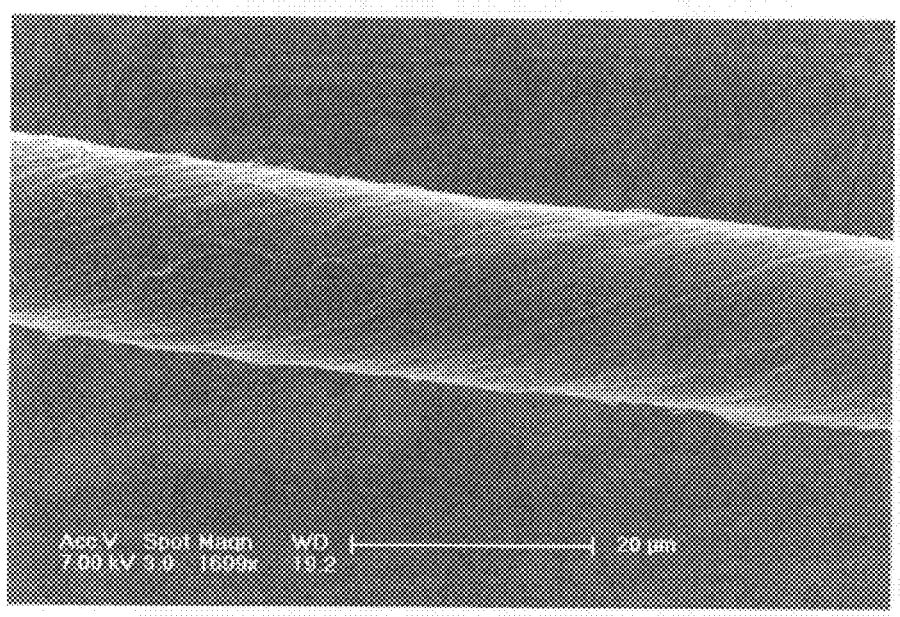
FIG. 5 is a Scanning Electron Microscope (SEM) image of a twisted carbon nanotube wire.

The twisted carbon nanotube wire can be formed by twisting a drawn carbon nanotube film by using a mechanical force to turn two ends of the carbon nanotube film in opposite directions. Referring to FIG. 5, the twisted carbon nanotube wire includes a plurality of carbon nanotubes oriented around an axial direction of the twisted carbon nanotube wire. The carbon nanotubes are aligned around the axis of the carbon nanotube twisted wire like a helix.

Figure 6:
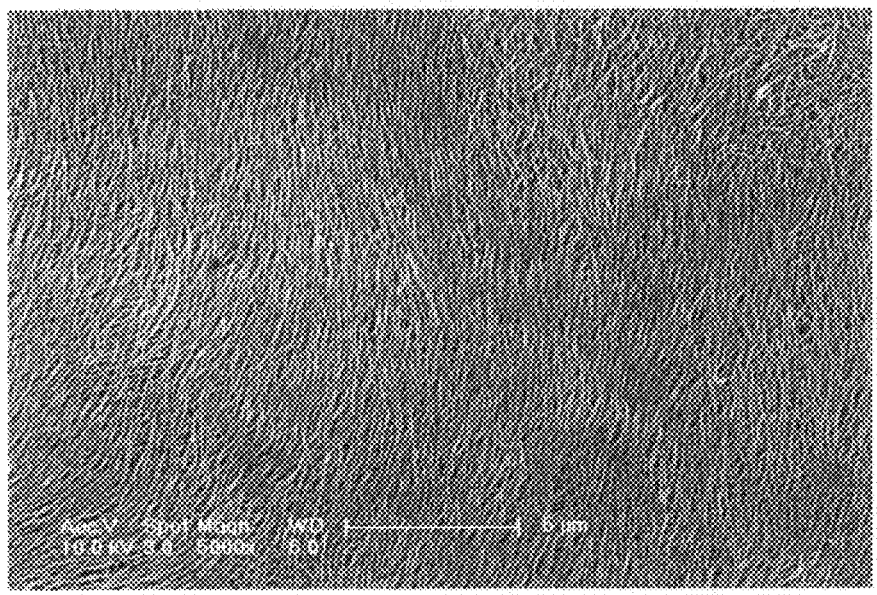
FIG. 6 is a Scanning Electron Microscope (SEM) image of a pressed carbon nanotube film with the carbon nanotubes.
Figure 7:
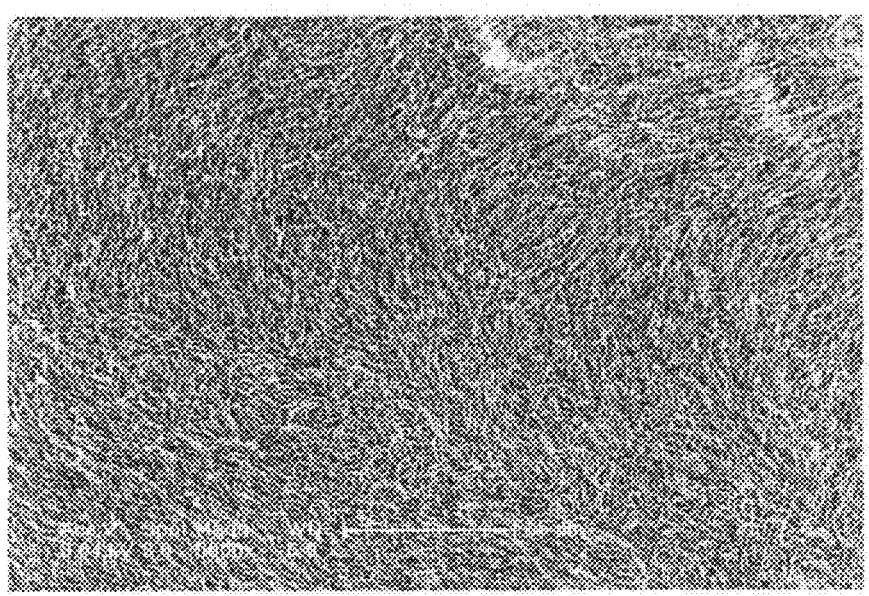
FIG. 7 is a Scanning Electron Microscope (SEM) image of a pressed carbon nanotube film with the carbon nanotubes arranged along two or more directions.

Referring to FIG. 6 and FIG. 7, the carbon nanotube structure can include at least one pressed carbon nanotube film. The pressed carbon nanotube film can be isotropic. The carbon nanotubes in the pressed carbon nanotube film can be substantially arranged along the same direction or arranged along two or more directions as shown in FIG. 7. The carbon nanotubes in the pressed carbon nanotube film can rest upon each other. The adjacent carbon nanotubes are combined and attracted by van der Waals attractive force, thereby forming a free-standing structure after being pressed. An angle between a primary alignment direction of the carbon nanotubes and a base of the pressed carbon nanotube film can be in a range from about 0 degrees to about 15 degrees. The pressed carbon nanotube film can be formed by pressing a carbon nanotube array. The angle is closely related to pressure applied to the carbon nanotube array. The greater the pressure, the smaller the angle. The carbon nanotubes in the pressed carbon nanotube film can be parallel to the surface of the pressed carbon nanotube film when the angle is 0 degrees. A length and a width of the pressed carbon nanotube film can be set as desired. Also, multiple pressed carbon nanotube films can be stated upon one another.

Figure 8:
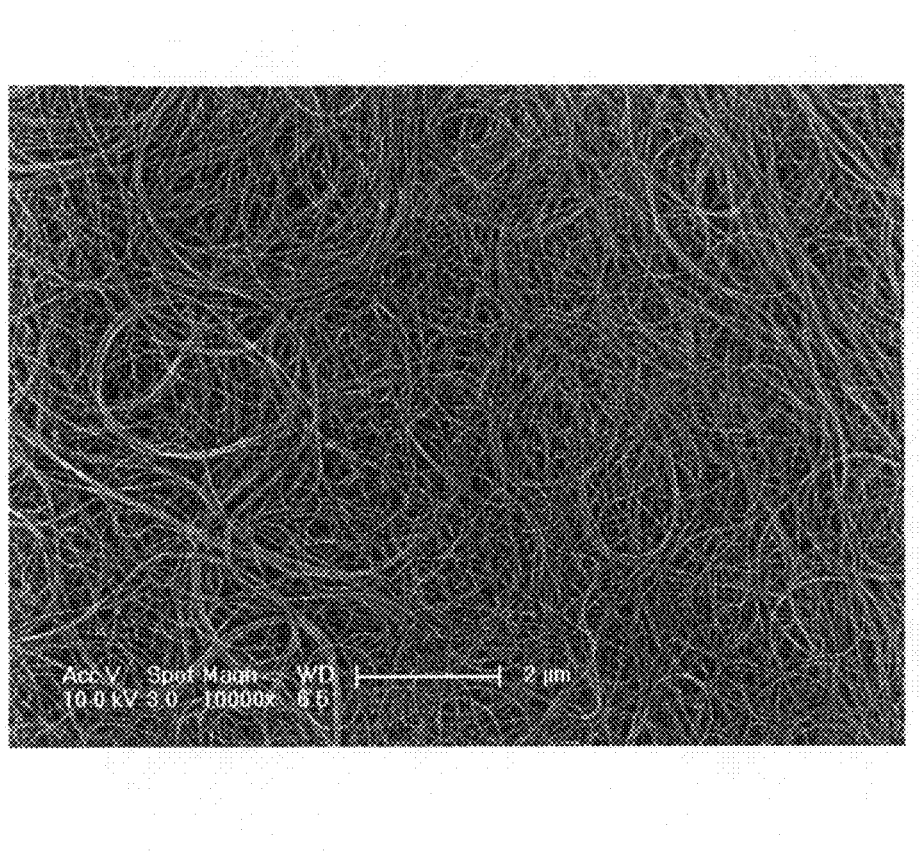
FIG. 8 is a Scanning Electron Microscope (SEM) image of a flocculent carbon nanotube film.

Referring to FIG. 8, the carbon nanotube structure may include at least one flocculent carbon nanotube film. The flocculent carbon nanotube film is formed of a plurality of carbon nanotubes entangled with each other. The length of the carbon nanotubes in the flocculent carbon nanotube film can be larger than 10 micrometers. The adjacent carbon nanotubes are combined and entangled by van der Waals attractive force therebetween, thereby forming a microporous structure. Further, the flocculent carbon nanotube film is isotropic. The sizes of the micropores can be less than 10 micrometers. The micropores can be used to diffuse the gas and/or biofuel. The length and a width of the flocculent carbon nanotube film is not limited. In one embodiment, the flocculent carbon nanotube film includes a plurality of long, curved, disordered carbon nanotubes entangled with each other.

In other embodiments, the carbon nanotube structure can include other materials thus becoming carbon nanotube composite. The carbon nanotube composite includes a carbon nanotube structure and a plurality of fillers dispersed therein. The filler can be comprised of a material selected from a group consisting of metal, ceramic, glass, carbon fiber and combinations thereof. In embodiments where the carbon nanotube structure is infused with metal, the conductivity of the carbon nanotube structure will be increased.

Alternatively, the carbon nanotube composite includes a carbon fiber paper and a plurality of carbon nanotubes dispersed therein. The carbon nanotubes filled in the carbon fiber paper will increase the conductivity of the carbon fiber paper. Furthermore, the carbon fiber paper filled with carbon nanotubes has smaller micropores which allow the carbon fiber paper to diffuse gas more uniformly. In one embodiment, mass ratio of the carbon nanotubes to the carbon fiber paper ranges from about 1% to about 15%.

The biofuel catalyst layer 404b comprises of a plurality of biofuel catalysts and a plurality of carriers. The biofuel catalyst can be any catalyst which can decompose the biofuel. The biofuel catalyst can be selected from a group consisting of enzymatic catalyst, microbe and combinations thereof. The enzymatic catalyst can be selected from the group comprising oxidase, dehydrogenase and combination thereof. The carrier is carbon particles. The carbon particles can be comprised of a material selected from a group consisting of graphite, carbon black, carbon fiber, carbon nanotubes and combinations thereof. In one embodiment, the biofuel catalyst is enzymatic catalyst. The enzymatic catalyst dispersed on the surface of carbon particles to form the biofuel catalyst layer 404b. Furthermore, the biofuel catalyst can include a plurality of electron mediators. The electron mediator can collect and conduct the electrons to the carbon nanotube structure.

Figure 9:
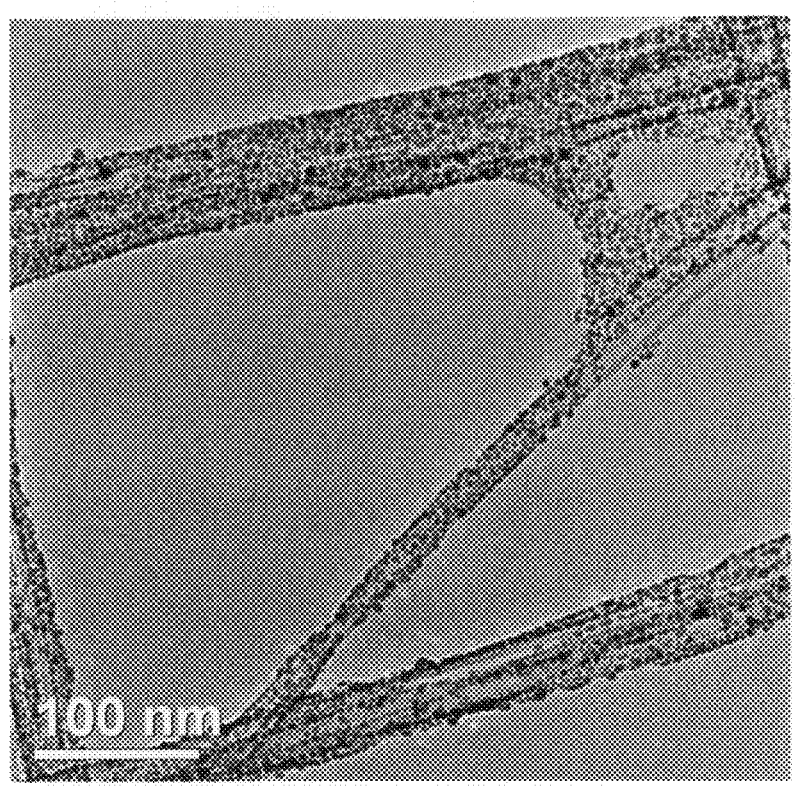
FIG. 9 is a Scanning Electron Microscope (SEM) image of a drawn carbon nanotube film deposited with platinum.

The cathode 406 can be a carbon nanotube composite comprised of a carbon nanotube structure and metal particles or enzymatic catalyst dispersed therein. The metal particles and/or enzymatic catalyst are dispersed on the surface of the carbon nanotubes of the carbon nanotube structure. In one embodiment, the cathode 406 includes a plurality of staked drawn carbon nanotube films and a plurality of metal particles dispersed therein. The cathode 406 can be fabricated by the following steps of: (a1) providing two or more drawn carbon nanotube films; (b1) forming a layer of catalyst particles on each drawn carbon nanotube film; (c1) staking the drawn carbon nanotube films to form a carbon nanotube composite. In step (b1), the catalyst particles are platinum and they are formed by sputtering for some embodiments. Referring to FIG. 9, the platinum particles are dispersed uniformly on the surface of the carbon nanotubes of the drawn carbon nanotube film.

In other embodiments, the cathode 406 can be a double-layer structure (not shown) that includes a diffusion layer and a catalyst layer. The catalyst materials can include metal particles. The metal particles can be selected from a group consisting of platinum particles, gold particles, ruthenium particles and combinations thereof. The diameter of the metal particles can range from about 1 nanometer to about 10 nanometers. The carrier can include carbon particles. The carbon particles can be comprised of a material selected from a group consisting of graphite, carbon black, carbon fiber, carbon nanotubes and combinations thereof. The distribution of the metal particles can be less than 0.5 milligram per square centimeter.

The material of the proton exchange membrane 402 can be selected from a group consisting of perfluorosulfonic acid, polystyrene sulfonic acid, polystyrene trifluoroacetic acid, phenol-formaldehyde resin acid, and hydrocarbons.

The membrane electrode assembly 400 has following advantages. Firstly, the diffusion layer 404a includes the carbon nanotube structure, and the carbon nanotube structure includes a plurality of micropores uniformly distributed therein. As such, the biofuel can be effectively and uniformly diffused in the carbon nanotube structure. Secondly, due to the carbon nanotube structure having good conductivity, the electrons needed or generated in the reactions are quickly conducted by the carbon nanotube structure.

Figure 10:
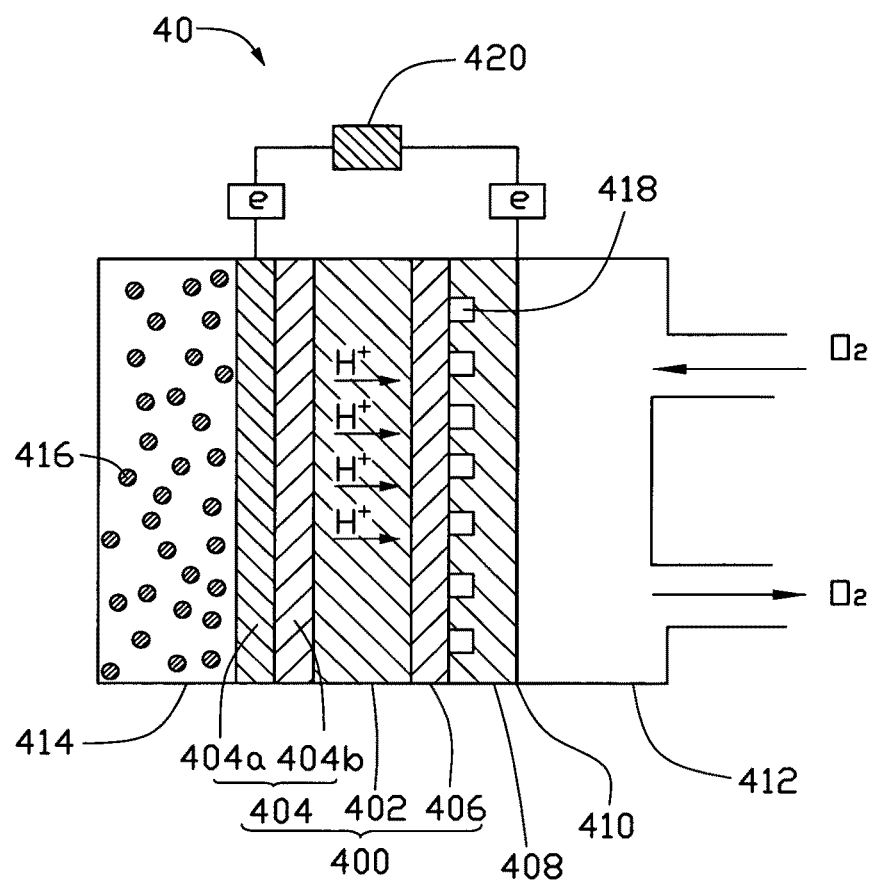
FIG. 10 is a schematic view of a biofuel cell in accordance with an embodiment.

Referring to FIG. 10, a biofuel cell 40 is provided according to one embodiment. The biofuel cell 40 includes a membrane electrode assembly (MEA) 400, a container 414, a flow field plate (FFP) 408, a current collector plates (CCP) 410, as well as a support equipment 412. The membrane electrode assembly 400 can be the membrane electrode assembly 400 provided in one embodiment.

The container 414 is located adjacent to the side of the anode 404 of the MEA 400 and used to load biofuel 416. In one embodiment, the biofuel 416 is glucose. The anode 404 is immerged in the biofuel 416 so that the enzymatic catalyst can come into contact with the biofuel 416. The proton exchange membrane 402 separates the biofuel 416 and the oxidant gases.

The FFP 408 is located adjacent to the side of the cathode 406 of the MEA 400. The FFP 408 has at least one flow field groove 418. The flow field groove 418 is in contact with the cathode 406. Thus, the flow field groove 418 is used to transport the oxidant gases, and the reaction product (e.g. water). The FFP 408 is made of metal or conductive carbon materials.

The CCP 410 is located adjacent to a surface of the FFP 408 facing away from the proton exchange membrane 402. The CCP 410 is made of conductive materials such as metal. The CCP 410 is used to collect and conduct the electrons generated by the work process of MEA 400.

Figure 11:
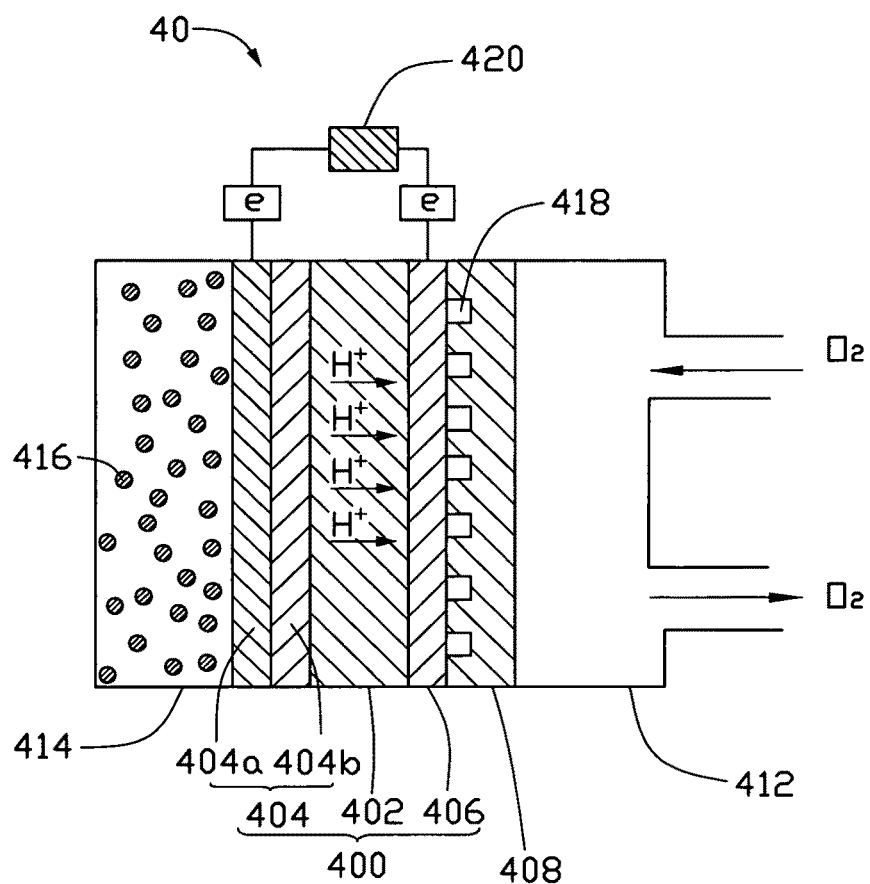
FIG. 11 is a schematic view of a biofuel cell in accordance with another embodiment.
Figure 12:
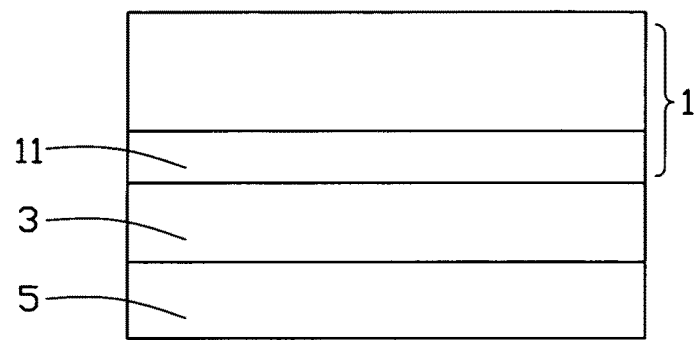
FIG. 12 is a schematic view of a membrane electrode assembly of the prior art.

Referring to FIG. 11, a fuel cell 40 is further provided according another embodiment. The fuel cell 40 has similar structure to the fuel cell 40 provided in previous embodiments except that it has no CCP because the carbon nanotube structure has excellent conductivity and can collect and conduct the electrons. The carbon nanotube structure can perform all of the functions of the CCP, thus eliminating the need for the CCP. This will reduce the materials needed to make the fuel cell 40.

The related support equipment 412 includes blowers, valves, and pipelines. The blower is connected with the flow field plate 408 via pipelines. The blowers blow the oxidant gases.

In the working process of the biofuel cell 40, a reaction of each glucose molecule in anode 404 of the MEA 400 is as follows:

$$\text{glucose} \rightarrow \text{gluconic acid} + 2H^+ + 2e$$

The hydrogen ions generated by the above-described reaction reach the cathode 406 through the proton exchange membrane 402. At the same time, the electrons generated by the reaction also arrive at the cathode 406 by an external electrical circuit. Oxygen is applied in the cathode 406 of the MEA 400. Thus, the oxygen reacts with the hydrogen ions and electrons as shown in the following equation:

$$\tfrac{1}{2}O_2 + 2H^+ + 2e \rightarrow H_2O$$

In the electrochemical reaction process, the electrons generate an electrical current, and as a result, are able to output electrical energy to a load 420 in the external electrical circuit.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A membrane electrode assembly comprising:
a proton exchange membrane comprising a first surface and a second surface;
an anode located on the first surface; and
a cathode located on the second surface;
wherein the anode comprises a diffusion layer and a biofuel catalyst layer in contact with the diffusion layer, the biofuel catalyst layer is located between the first surface and the diffusion layer, the biofuel catalyst layer comprises biofuel catalyst material and carbon particles, and the diffusion layer comprises a carbon nanotube structure comprising at least one drawn carbon nanotube film, and the at least one carbon nanotube film comprises a plurality of carbon nanotube segments successively oriented along a fixed direction, and joined end-to-end longitudinally along the fixed direction, by van der Waals attractive force therebetween, wherein each carbon nanotube segment comprises a plurality of carbon nanotubes parallel to each other and combined by van der Waals attractive force therebetween, and the carbon nanotubes of the at least one drawn carbon nanotube film are oriented along the fixed direction.

2. The membrane electrode assembly as claimed in claim 1, wherein the carbon nanotube structure comprises a plurality of carbon nanotubes.

3. The membrane electrode assembly as claimed in claim 1, wherein the carbon nanotube structure comprises at least one carbon nanotube wire or combinations thereof.

4. The membrane electrode assembly as claimed in claim 3, wherein the at least one carbon nanotube wire is an untwisted carbon nanotube wire comprising a plurality of carbon nanotubes joined end-to-end by van der Waals attractive force, the plurality of carbon nanotubes are parallel to an axis of the untwisted carbon nanotube wire.

5. The membrane electrode assembly as claimed in claim 3, wherein the at least one carbon nanotube wire is a carbon nanotube twisted wire comprising a plurality of carbon nanotubes aligned about an axis of the carbon nanotube twisted wire.

6. The membrane electrode assembly as claimed in claim 1, wherein the carbon nanotube structure comprises a plurality of micropores, and diameters of the micropores range from about 1 to about 10 micrometers.

7. The membrane electrode assembly as claimed in claim 1, wherein the biofuel catalyst material is selected from the group consisting of enzymatic catalyst, microbe and combinations thereof.

8. The membrane electrode assembly as claimed in claim 1, wherein the biofuel catalyst material is selected from the group consisting of oxidase, dehydrogenase and combinations thereof.

9. The membrane electrode assembly as claimed in claim 1, wherein the cathode comprises a carbon nanotube structure and catalyst material dispersed therein.

10. The membrane electrode assembly as claimed in claim 1, wherein the carbon nanotube structure comprises two or more stacked drawn carbon nanotube films, each of the two or more stacked drawn carbon nanotube films comprises a plurality of carbon nanotubes, the majority of the plurality of carbon nanotubes in each of the two or more stacked drawn carbon nanotube films are oriented along a same oriented direction, an angle between the oriented directions of the carbon nanotubes of the two adjacent stacked drawn carbon nanotube films is in a range from about 0 degrees to about 90 degrees.

* * * * *